United States Patent
Kurumizawa et al.

(10) Patent No.: US 8,602,804 B2
(45) Date of Patent: Dec. 10, 2013

(54) POWER PLUG LOCKING DEVICE

(75) Inventors: Naoto Kurumizawa, Aichi (JP);
Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 87 days.

(21) Appl. No.: 13/418,798

(22) Filed: Mar. 13, 2012

(65) Prior Publication Data

US 2012/0238121 A1    Sep. 20, 2012

(30) Foreign Application Priority Data

Mar. 18, 2011    (JP) ................................. 2011-061437

(51) Int. Cl.
*H01R 13/62* (2006.01)

(52) U.S. Cl.
USPC ............................ 439/304; 439/352; 320/109

(58) Field of Classification Search
USPC ........... 439/304, 310, 352, 358, 34, 133, 372; 329/109, 2
See application file for complete search history.

(56) References Cited

U.S. PATENT DOCUMENTS

| | | | | |
|---|---|---|---|---|
| 5,536,173 A * | 7/1996 | Fujitani et al. | ................ | 439/34 |
| 5,751,135 A * | 5/1998 | Fukushima et al. | ......... | 320/107 |
| 6,194,854 B1 * | 2/2001 | Uchibori et al. | ............. | 318/280 |
| 6,203,355 B1 * | 3/2001 | Neblett et al. | ............... | 439/372 |
| 7,950,943 B2 * | 5/2011 | Ohtomo | ...................... | 439/299 |
| 8,016,604 B2 * | 9/2011 | Matsumoto et al. | ......... | 439/304 |
| 8,025,526 B1 * | 9/2011 | Tormey et al. | ............... | 439/528 |
| 8,075,329 B1 * | 12/2011 | Janarthanam et al. | ...... | 439/304 |
| 8,172,599 B2 * | 5/2012 | Konchan | ..................... | 439/352 |
| 8,206,172 B2 * | 6/2012 | Katagiri et al. | .............. | 439/352 |
| 8,251,734 B2 * | 8/2012 | Katagiri et al. | .............. | 439/352 |
| 8,262,402 B2 * | 9/2012 | Gaul et al. | ................... | 439/304 |
| 8,317,534 B2 * | 11/2012 | Osawa et al. | ................. | 439/353 |
| 8,357,001 B2 * | 1/2013 | Katagiri et al. | .............. | 439/304 |
| 8,357,002 B2 * | 1/2013 | Katagiri et al. | .............. | 439/304 |
| 8,376,767 B2 * | 2/2013 | Kahara et al. | ................ | 439/304 |
| 8,376,768 B2 * | 2/2013 | Kurumizawa et al. | ....... | 439/304 |
| 2011/0034053 A1 * | 2/2011 | Matsumoto et al. | ......... | 439/304 |
| 2011/0223792 A1 * | 9/2011 | Osawa et al. | ................. | 439/345 |
| 2012/0088382 A1 * | 4/2012 | Konchan | ..................... | 439/153 |

FOREIGN PATENT DOCUMENTS

JP    09-161898    6/1997

* cited by examiner

*Primary Examiner* — Gary F. Paumen
(74) *Attorney, Agent, or Firm* — Greenblum & Bernstein P.L.C.

(57) ABSTRACT

A power plug locking device includes a lock unit that restricts movement of an operation arm arranged on a power plug. The lock unit includes a first member, which is moved between a lock position and an unlock position, and a second member, of which movement is restricted in accordance with the movement of the first member. The second member restricts the movement of the operation arm in cooperation with the first member that is moved to the lock position. The first member includes a first contact surface. The second member includes a second contact surface that is able to contact the first member that is moved to the lock position. At least one of the first contact surface and the second contact surface includes a stepped shape.

5 Claims, 7 Drawing Sheets

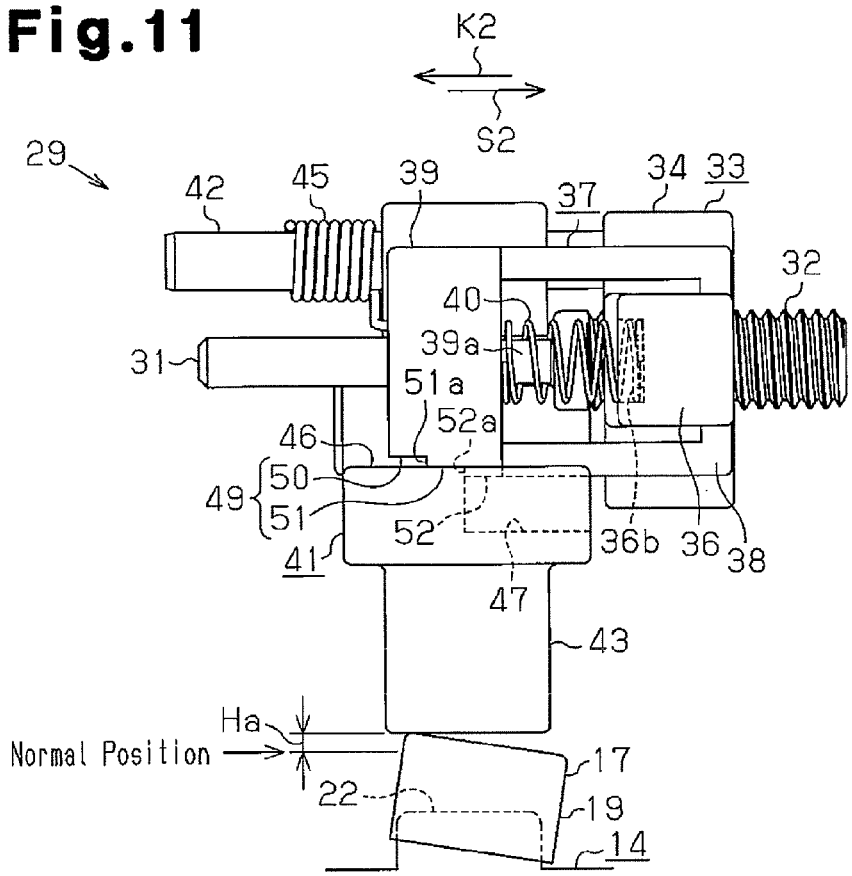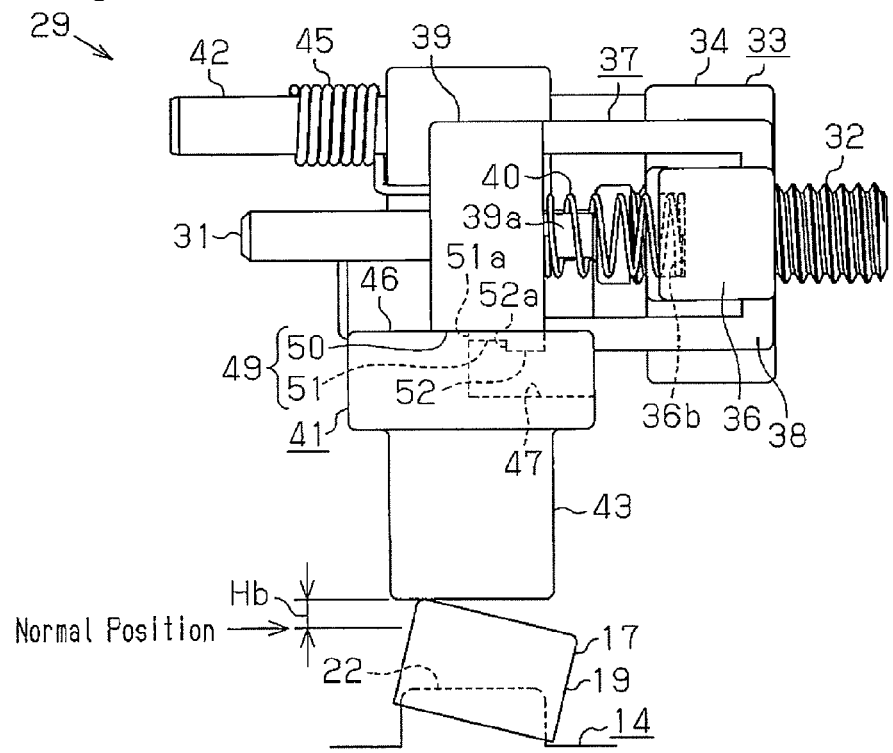

POWER PLUG LOCKING DEVICE

CROSS-REFERENCE TO RELATED APPLICATIONS

This application is based upon and claims the benefit of priority from prior Japanese Patent Application No. 2011-061437, filed on Mar. 18, 2011, the entire contents of which are incorporated herein by reference.

BACKGROUND

The present invention relates to a power plug locking device that locks a power plug to an object, such as a vehicle, and prevents unauthorized removal of the power plug from the object.

Over these recent years, consumers have become conscious of environmental problems. Thus, vehicles that emit less carbon dioxide such as hybrid vehicles and electric vehicles have become popular. Such vehicles are driven by a battery-powered motor. When such a vehicle travels over a long distance and the state of charge of the battery becomes low, the battery must be charged (refer to Japanese Laid-Open Patent Publication No. 9-161898).

The charging of a battery involves an electrolytic reaction of compounds and ions in battery cells of the battery. This lengthens the charging time. Thus, when a user leaves the vehicle while the battery is being charged, someone may remove the power plug to steal electricity. Hence, power plug locking devices have been developed to prevent unauthorized removal of the power plug from a vehicle.

One type of such a power plug locking device includes a lock cover that uses a lock bar, which is arranged in an power plug inlet of a vehicle, to restrict the movement of a pivotal hook (also referred to as a lock arm), which is arranged on a power plug. In this structure, when the power plug is connected to the inlet, the lock arm is pivoted and hooked to a projection on the inlet. This holds the power plug on the inlet. The lock arm has a basal portion that includes a lever. The lever is pushed to pivot the lock arm in an opening direction and release the lock arm from the projection.

The arrangement of the lock bar above the lock arm in a state in which the lock arm is hooked to the projection of the inlet restricts movement of the lock arm in the opening direction. This locks the power plug to the inlet. In this state, the power plug locking device is in a lock state. When the lock bar is separated from the lock arm, the movement of the lock arm in the opening direction is permitted. This unlocks the power plug. In this state, the power plug locking device is in an unlock state. In the unlock state, the power plug can be removed from the inlet.

When using the power plug locking device, the lock arm may not be properly hooked to the projection of the inlet depending on the circumstance. In such a case, the lock arm would be in an incomplete hooking state. In an incomplete hooking state, the lock arm would be located above a normal position (correct hooking position). As a result, the lock arm would interfere with the movement of the lock bar, and the lock bar would not be able to move to above the lock arm. That is, the lock bar would not be able to move to a normal lock position. Thus, the power plug locking device would not be able to shift to a lock state.

An incomplete hooking state may occur, for example, when the power plug and the inlet are manufactured by different manufacturers. Further, an incomplete hooking state may occur when the power plug is dropped and the lock arm is thereby deformed or when wear of a pivotal shaft of the lock arm obstructs movement of the lock arm in a closing direction. An incomplete hooking state may also occur when foreign matter is caught in the lock arm or when the weight of the power plug (charge cable) lifts and displaces the lock arm in the opening direction.

SUMMARY

The present invention provides a power plug locking device that is able to be shifted to a lock state to restrict movement of a lock arm even when the lock arm is in an incomplete hooking state.

One aspect of the present invention is a power plug locking device that prevents unauthorized removal of a power plug from an inlet. The power plug includes an operation arm that is able to be hooked to the inlet. The power plug locking device includes a lock unit that restricts movement of the operation arm when the operation arm is hooked to the inlet. The lock unit includes a first member, which is moved between a lock position and an unlock position, and a second member, of which movement is restricted in accordance with the movement of the first member. The second member restricts movement of the operation arm in cooperation with the first member that is moved to the lock position. The first member includes a first contact surface. The second member includes a second contact surface that can contact the first contact surface of the first member that is moved to the lock position. At least one of the first contact surface and the second contact surface is formed with a stepped shape.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a rear view showing the lock mechanism in an incomplete hooking state; and FIG. 12 is a rear view showing the lock mechanism in an incomplete hooking state.

DETAILED DESCRIPTION OF THE INVENTION

One embodiment of a power plug locking device according to the present invention will now be described with reference to FIGS. 1 to 12.

Figure 1:
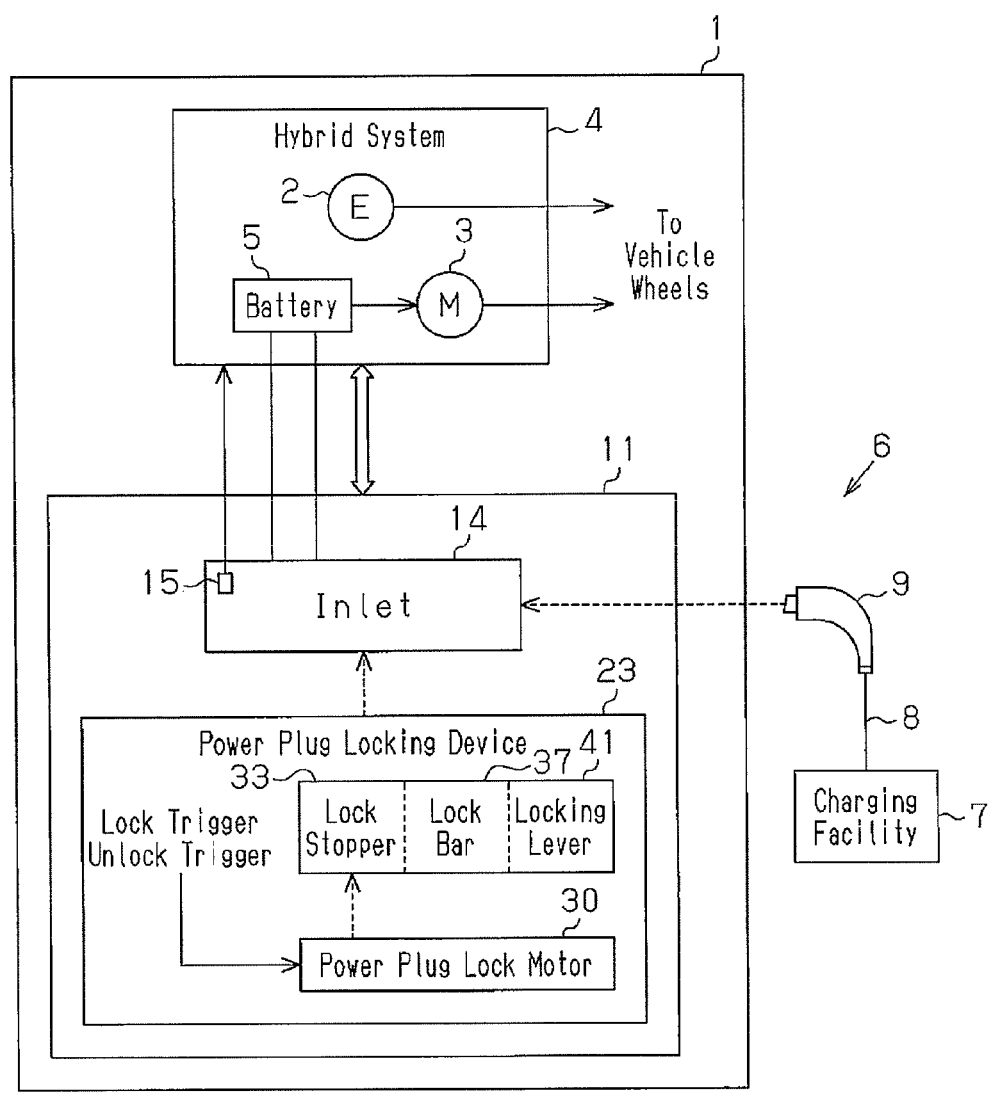
FIG. 1 is a schematic diagram of a vehicle in one embodiment.

Referring to FIG. 1, a hybrid vehicle 1 includes an engine 2 and a motor 3, which form a hybrid system 4 and generate power to rotate vehicle wheels. The hybrid system 4 includes a battery 5, which serves as a power supply for the motor 3. The vehicle 1 is driven in various modes, such as a mode that drives the vehicle with the motor 3 by generating electric power with the engine 2, a mode that drives the vehicle 1 with the power of both the engine 2 and the motor 3, and a mode that drives the vehicle 1 with the power of only the motor 3.

The vehicle 1 includes a charge system 6 that charges the battery 5 with an external power supply. The charge system 6 uses a charging facility, such as a charging station or a residential power outlet, to charge the battery 5. The charging facility 7 includes a charge cable 8. A power plug 9 is arranged on a distal end of the charge cable 8. The power plug 9 may be connected to the vehicle 1.

Figure 2:
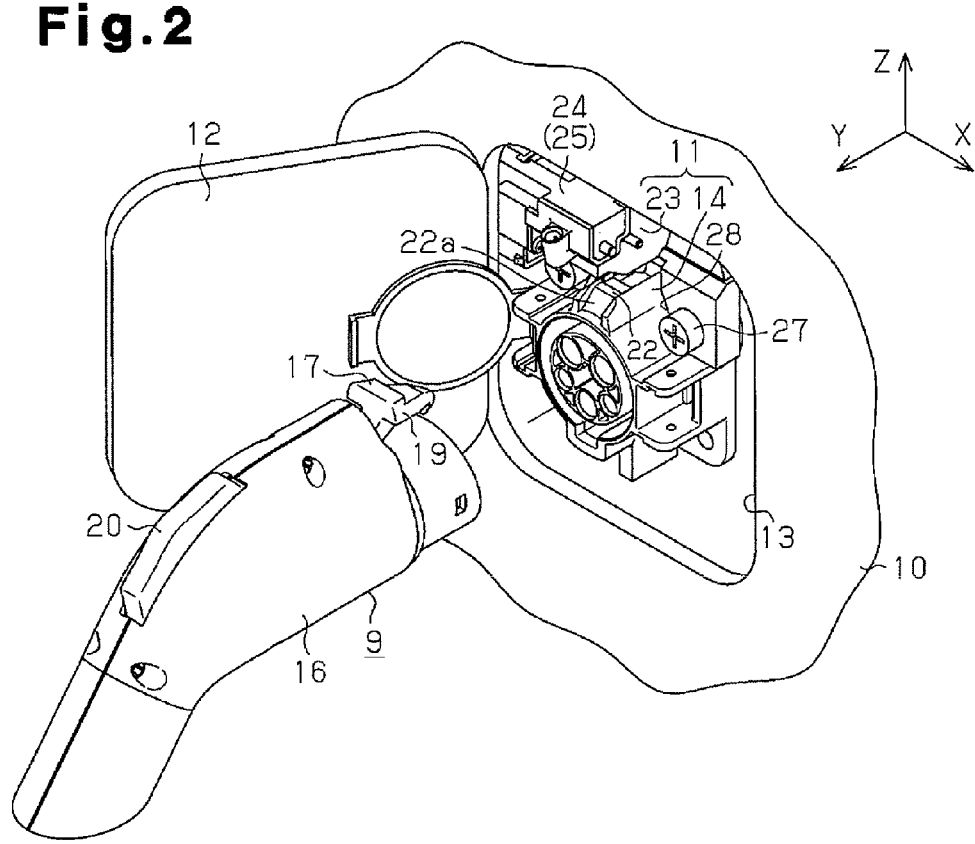
FIG. 2 is a perspective view showing a power plug and an inlet.

Referring to FIGS. 1 and 2, a power reception connector 11 is arranged in a side wall of a vehicle body 10. The power plug 9 may be connected to the power reception connector 11. The power reception connector 11 includes an accommodation compartment 13. A lid 12 opens and closes the accommodation compartment 13. The power reception connector 11 includes an inlet 14 accommodating electric connection terminals (e.g., power terminal and control terminal). A plug connection detector 15 is arranged in the inlet 14 to detect whether the power plug 9 is completely fitted to the inlet 14.

Figure 3:
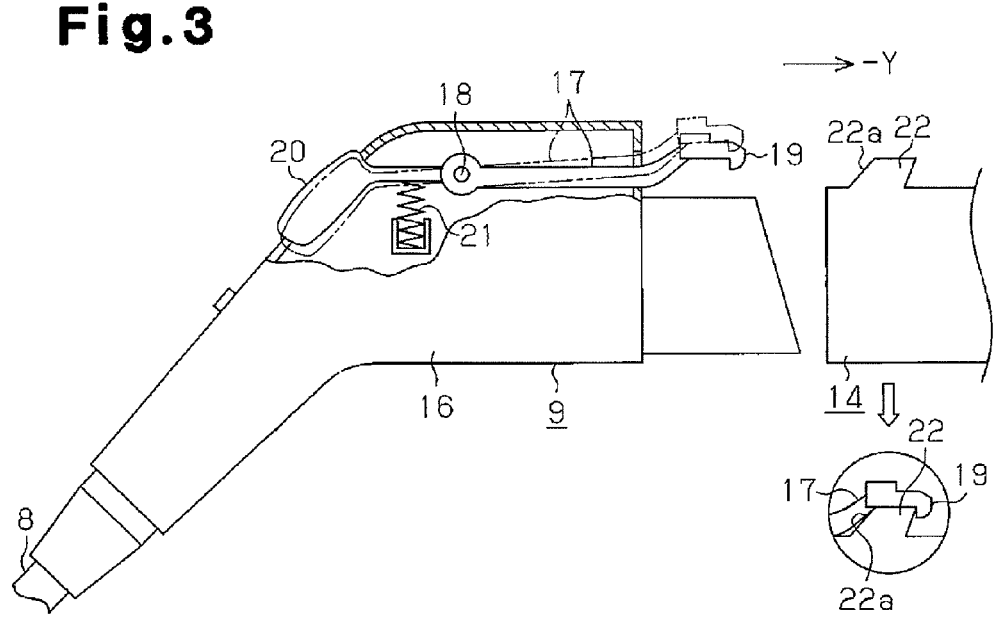
FIG. 3 is a side view, partially in cross-section, showing the structure of the power plug and how the power plug is connected to a vehicle.

Referring to FIGS. 2 and 3, the power plug 9 includes a plug body 16. The plug body 16 includes electrical connection terminals, which are connected to the electrical connection terminals of the inlet 14. A lock arm 17 is pivotally coupled to the plug body 16 to prevent separation from the inlet 14. The lock arm 17 is pivoted upward and downward about a pivot shaft 18, which is arranged in the middle of the lock arm 17. The lock arm 17 includes a distal portion defining a hook 19 and a basal portion defining a lever 20. The hook 19 and lever 20 are exposed from the plug body 16. An urging member 21 is arranged near the lever 20 to urge the lock arm 17 in a closing direction. The lock arm 17 is one example of an operation arm.

To connect the power plug 9 to the power reception connector 11, the power plug 9 is fitted straight in an insertion direction (-Y axis direction of FIG. 3) into the power reception connector 11. This guides and raises the hook 19 along a sloped surface 22a of a projection 22 on the inlet 14. When the power plug 9 is completely fitted to the inlet 14, the urging force of the urging member 21 pivots the lock arm 17 in the closing direction and hooks the hook 19 to the projection 22. This prevents separation of the power plug 9 from the inlet 14.

The hybrid system 4 includes a control unit (not shown). When the control unit determines with the plug connection detector 15 that the power plug 9 has been completely fitted to the inlet 14, the control unit sends a charge start request to the charging facility 7 through the power plug 9. When the charging facility 7 receives the charge start request, the power plug 9 starts supplying power to the power reception connector 11 and charges the battery 5. When determining that the battery 5 has been fully charged, the control unit of the hybrid system 4 sends a charge end request to the charging facility 7. When receiving the charge end request, the charging facility 7 stops supplying power to the power reception connector 11 from the power plug 9. This ends the charging operation.

When removing the power plug 9 from the inlet 14, the lever 20 is pressed to pivot the lock arm 17 in an opening direction. This separates the lock arm 17 from the projection 22. In this state, the power plug 9 is pulled straight and removed from the inlet 14.

Figure 4:
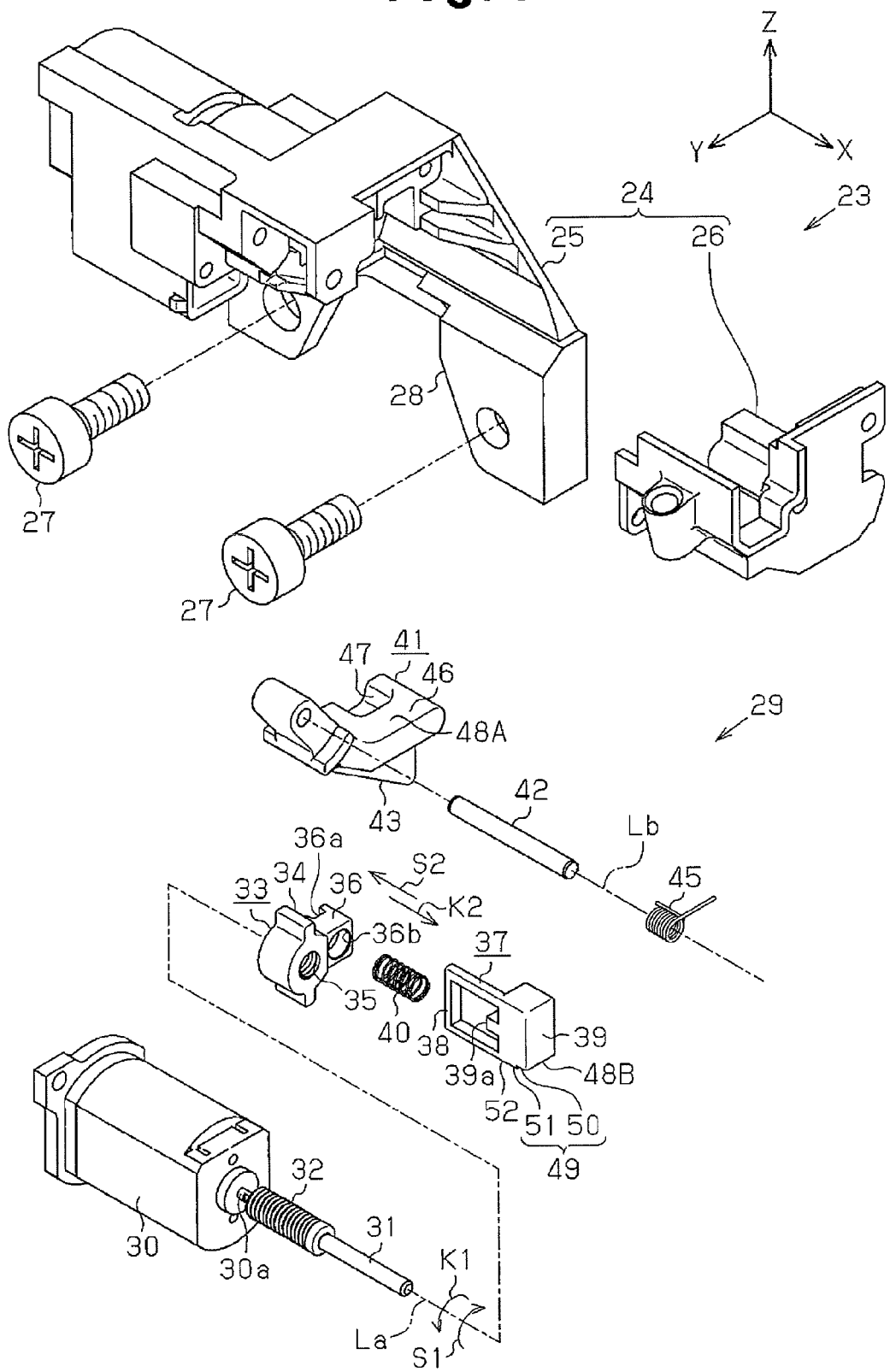
FIG. 4 is an exploded perspective view showing a power plug locking device.
Figure 5:
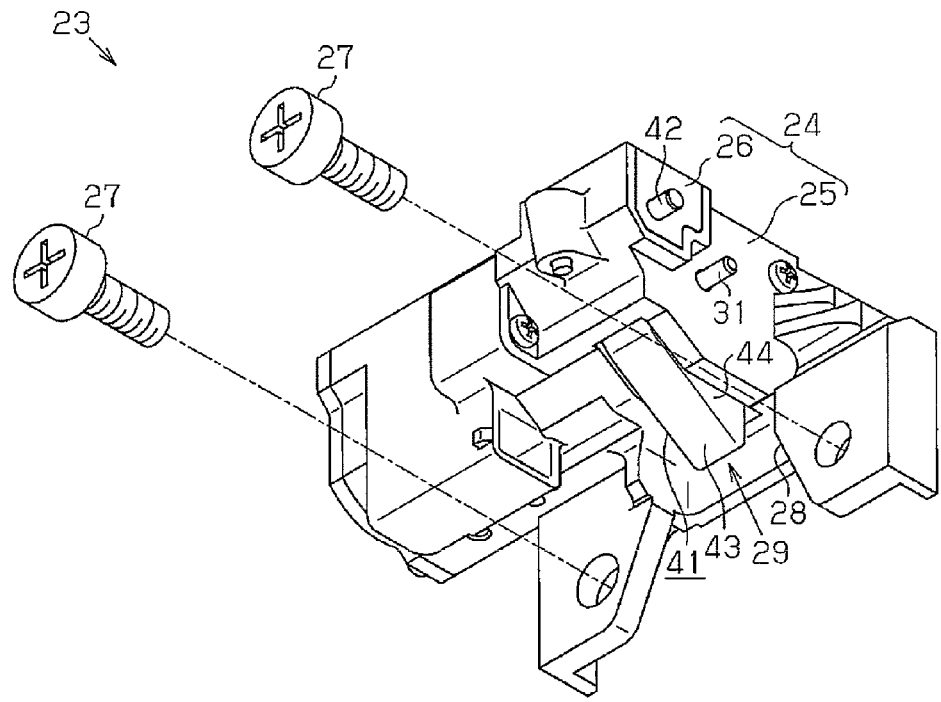
FIG. 5 is a perspective view showing the power plug locking device from a lower side.
Figure 6:
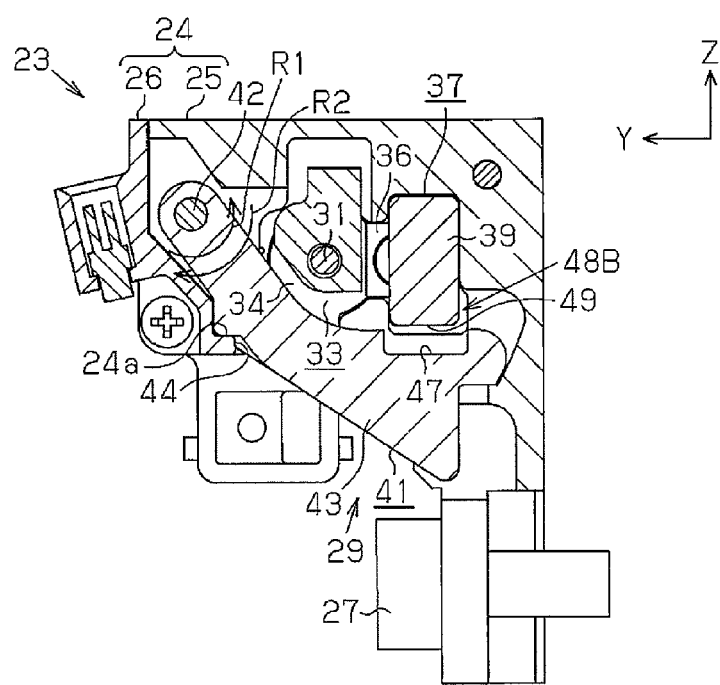
FIG. 6 is a cross-sectional view of the power plug locking device.

Referring to FIGS. 4 to 6, the power reception connector 11 includes a power plug locking device 23 that prevents unauthorized removal of the power plug 9 from the inlet 14. The locking device 23 includes a case 24, which accommodates various components. The case 24 includes a body 25 and a lid 26, which closes an opening of the body 25. Fasteners 27 securely fasten the body 25 of the case 24 to the inlet 14. The body 25 includes a recess 28 that allows for passage of the lock arm 17 when the power plug 9 is connected to and removed from the inlet 14.

As shown in FIG. 4, the case 24 accommodates a lock mechanism 29 that includes a power plug lock motor 30, which is arranged in the body 25. The motor 30 is, for example, a DC motor and includes a motor shaft 30a, which is arranged in a lateral direction (X axis direction in FIG. 4) of the locking device 23. The motor 30 is one example of a driving device.

A shaft 31 is coupled to the motor shaft 30a. The shaft 31 rotates integrally with the motor shaft 30a. A gear 32 is arranged on the shaft 31. A lock stopper 33 is coupled to the gear 32 to covert the torque of the motor 30 to linear movement force acting in a direction parallel to the motor shaft 30a. The lock stopper 33 includes a stopper main body 34 through which a threaded hole 35 extends. The gear 32 is engaged with the threaded hole 35 whereby the lock stopper 33 is coupled to the motor 30. When the motor 30 produces rotation in one direction about an axis La (the direction of arrow K1 in FIG. 4), the lock stopper 33 moves straight in a lock direction (the direction of arrow K2 in FIG. 4). When the motor 30 produces rotation in the other direction about the axis La (the direction of arrow S1 in FIG. 4), the lock stopper 33 moves straight in an unlock direction (the direction of arrow S2 in FIG. 4). The lock stopper 33 is one example of a coupling movement member.

The lock stopper 33 includes a side wall from which a support 36 projects. A lock bar 37, which moves in cooperation with the lock stopper 33, is coupled to the support 36. The lock stopper 33 is moved as a seat for the lock bar 37. The lock bar 37 includes a coupling frame 38, through which the support 36 extends, and a lock bar main body 39, which is generally box-shaped and formed integrally with the distal end of the coupling frame 38. The coupling frame 38 is hooked to a hooking groove 36a, which is formed in a rear side of the support 36. This prevents separation of the lock bar 37 from the lock stopper 33.

An urging member 40 is arranged between the lock stopper 33 and the lock bar 37. The urging member 40 is, for example, a coil spring and includes one end fixed to a recess 36b of the support 36 and another end fixed to a protrusion piece 39a of the lock bar main body 39. In the present example, the lock stopper 33 and the lock bar 37 move straight and integrally with each other in the lock direction K2. The movement of the lock bar 37 may be obstructed for one reason or another. Under such a situation, the urging member 40 absorbs the stress applied in the unlock direction S2 to the lock bar 37 so that the lock stopper 33 continues to move in the lock direction K2. In the present invention, the coupling frame 38 and the urging member 40 form an absorption unit.

The lock mechanism 29 further includes a shaft 42, which is pivotally coupled to the body 25, and a locking lever 41, which is fixed to the shaft 42. The shaft 42 has an axis Lb, which extends in a lateral direction X. The locking lever 41 is pivoted integrally with the shaft 42 about the axis Lb. The locking lever 41 restricts pivoting of the lock arm 17 in cooperation with the lock bar 37. A triangular arm contact portion 43, which comes into contact with the hook 19 of the lock arm 17, projects from a lower part of the locking lever 17. The arm contact portion 43 is exposed outward from an opening 44 formed in the bottom surface of the case 24 (body 25). When the power plug 9 is connected to or removed from the inlet 14, the arm contact portion 43 contacts the lock arm 17. In the present example, the lock stopper 33 (coupling movement member), the lock bar 37 (first member), and the locking lever 41 (second member) form a lock unit.

An urging member 45 is arranged on the shaft 42 to pivot and urge the locking lever 41 toward the lock arm 17. As shown in FIG. 6, the case 24 includes an inner wall 24a, which comes into contact with the locking lever 41. The locking lever 41 is normally located at a position where it contacts the inner wall 24a of the locking lever 41. From this position, the locking lever 41 is pivotal against the urging force of the urging member 45 (not shown in FIG. 6) in an upward direction (direction of arrow R1 in FIG. 6). The locking lever 41, which is pivoted in the upward direction R1, is pivotal in a downward direction (direction of arrow R2 in FIG. 6) by the urging force of the urging member 45.

As shown in FIG. 4, the locking lever 41 includes a stepped inner surface (upper surface as viewed in FIG. 4), which defines a position restriction portion 46 and a recess 47. The position restriction portion 46 includes a contact surface 48A, which comes into contact with a contact surface 48B of the lock bar 37 when the lock bar 37 moves to a lock position (refer to FIGS. 9 and 10). The recess 47 is formed next to the position restriction portion 46 in the unlock direction S2 of the lock bar 37. The recess 47 has an inner bottom surface formed at a lower position than the contact surface 48A of the position restriction portion 46 in a vertical direction (Z axis direction in FIG. 4) of the locking device 23.

Figure 7:
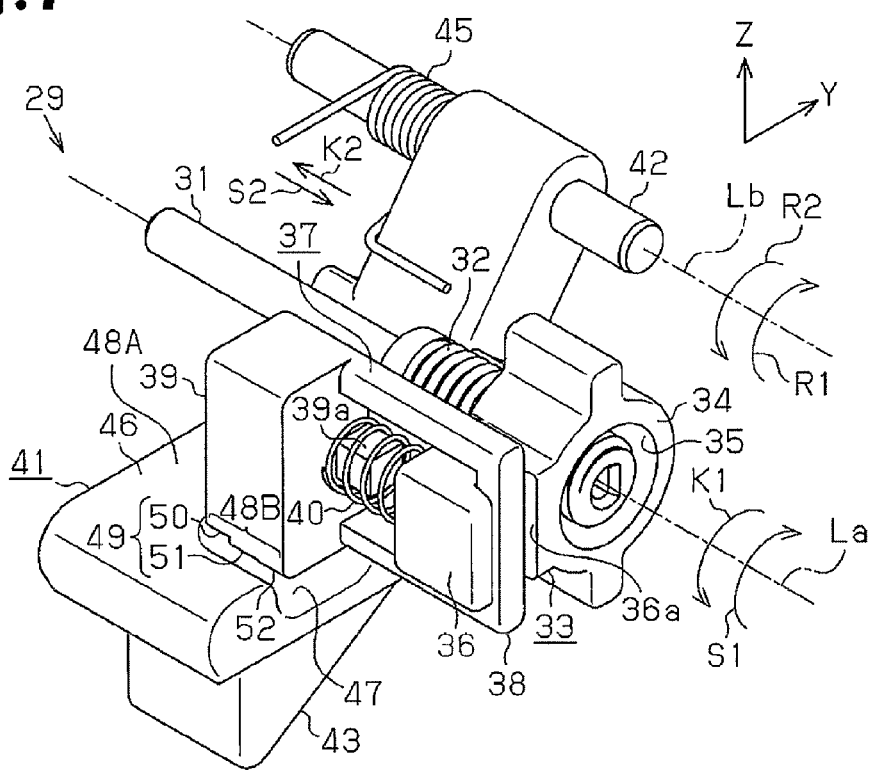
FIG. 7 is a perspective view showing a lock mechanism in an unlock state from the rear.
Figure 8:
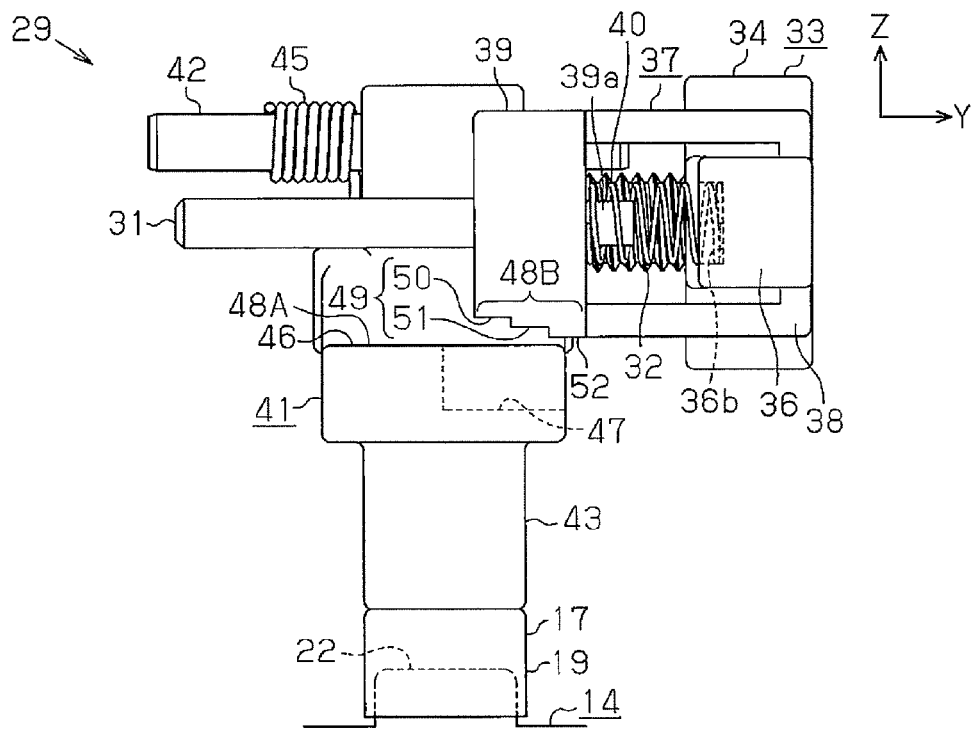
FIG. 8 is a rear view showing the lock mechanism in the unlock state.
Figure 9:
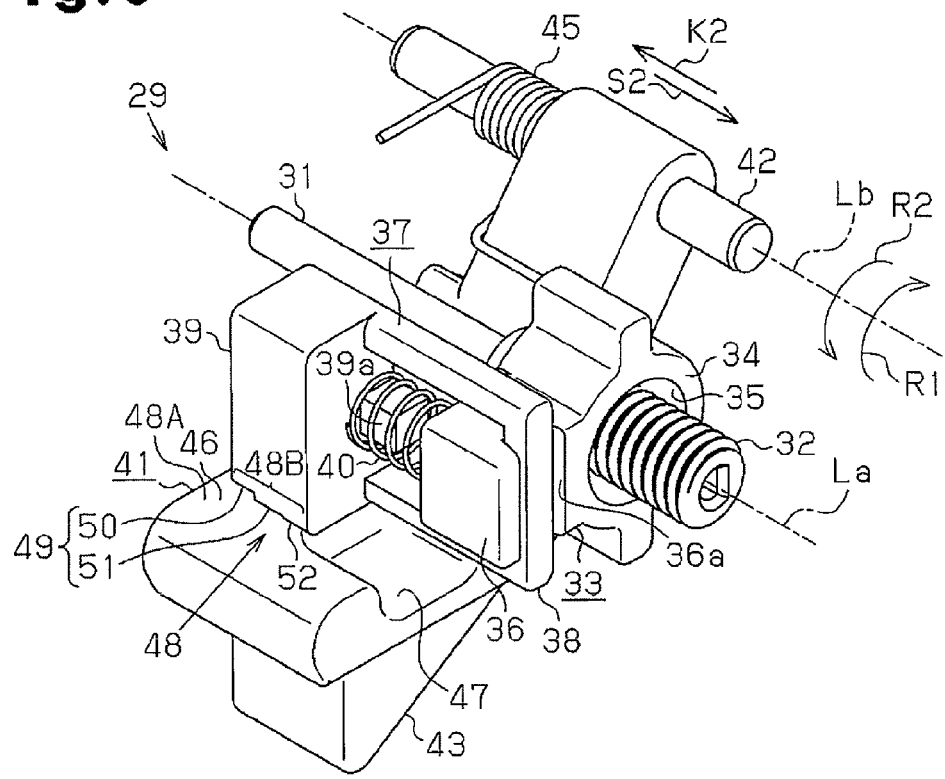
FIG. 9 is a perspective view showing the lock mechanism in a lock state from the rear.
Figure 10:
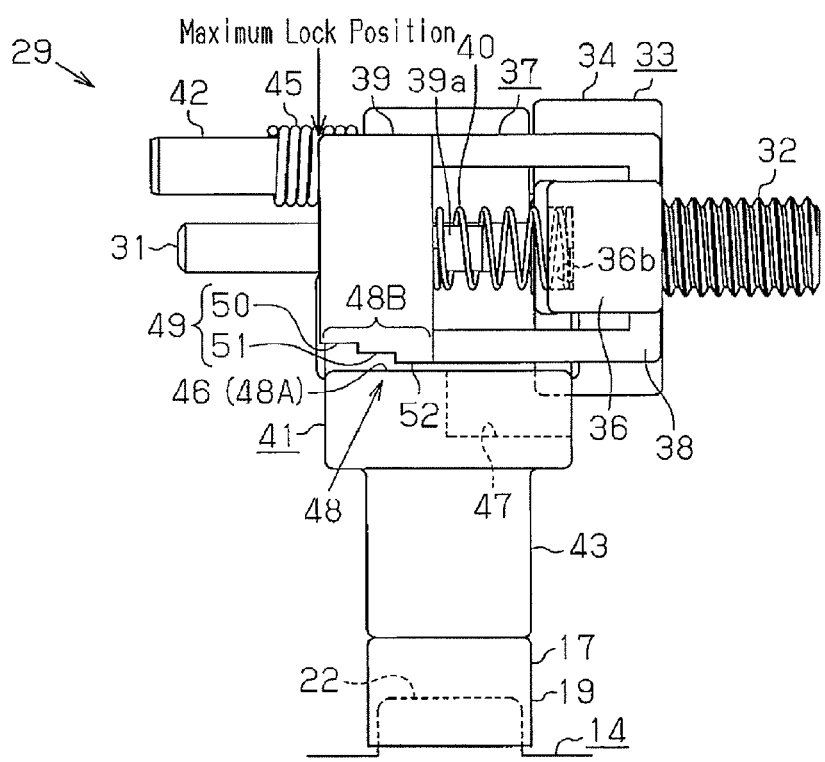
FIG. 10 is a rear view showing the lock mechanism in the lock state.

Referring to FIGS. 9 and 10, when the lock bar 37 moves straight to the lock position in the lock direction K2, the contact surface 48B of the lock bar 37 faces the contact surface 48A of the position restriction portion 46. In this state, the lock bar 37 restricts pivoting of the locking lever 41 in the upward direction R1. This state is referred to as a lock state of the locking device 23. In the lock state, the connection and removal of the power plug 9 is prohibited. Referring to FIGS. 7 and 8, when the lock bar 37 moves straight to an unlock position in the unlock direction S2, the contact surface 48B of the lock bar 37 faces the recess 47. In this state, the lock bar 37 permits pivoting of the locking lever 41 in the upward direction R1. This state is referred to as an unlock state of the locking device 23. In the unlock state, the connection and removal of the power plug 9 is permitted.

Referring to FIGS. 7 to 12, the contact surface 48B of the lock bar 37 is formed with a stepped shape. That is, the contact surface 48B includes a stepped portion 49. As shown in FIGS. 11 and 12, the hook 19 of the lock arm 17 may not be completely hooked to the projection 22. Such a state is referred to as an incomplete hooking state of the lock arm 17. In the incomplete hooking state, movement of the lock bar 37 in the lock direction K2 is restricted. The stepped portion 49 of the contact surface 48B permits movement of the lock bar 37 in the lock direction K2 even when the lock arm 17 is in the incomplete hooking state so that the locking lever 41 pushes the lock arm 17 from above and restricts movement of the lock arm 17. In other words, the stepped portion 49 allows the locking device 23 to enter a lock state even when the lock arm 17 is in an incomplete hooking state. This widens the range of the lock position of the lock bar 37.

The stepped portion 49 includes a plurality of steps, namely, first and second steps 50 and 51 in the present example. In this manner, the contact surface 48B of the lock bar 37 includes a normal contact portion 52, which serves as a reference surface, and the stepped portion 49, which includes the first and second steps 50 and 51. The normal contact portion 52, the second step 51, and the first step 50 are arranged next to one another in this order in the lock direction K2. Thus, when the lock bar 37 moves in the lock direction K2, first, the first step 50, then the second step 51, and finally, the normal contact portion 52 face toward the contact surface 48A of the position restriction portion 46. The second step 51 is lower than the normal contact portion 52, and the first step 50 is further lower than the second step 51. In this structure, not only a position at which the normal contact portion 52 faces toward the contact surface 48A of the position restriction portion 46, but also a position at which the second step 51 faces toward the contact surface 48A, as well as a position at which the first step 50 faces toward the contact surface 48A may be used as the lock position of the lock bar 37. As a result, the range of the lock position of the lock bar 37 is widened in the unlock direction S2.

The operation of the locking device 23 will now be described with reference to FIGS. 10 to 12.

When the locking device 23 is in an unlock state and a lock trigger is received at the motor 30, the motor 30 produces rotation in one direction (e.g., forward rotation) and starts a lock operation. In this state, the lock stopper 33 and lock bar 37 move integrally and straight in the lock direction K2. In case that a power plug locking operation is performed in cooperation with a door lock operation, the lock trigger may be current (voltage) directly supplied from a door lock motor (not shown). Alternatively, the lock trigger may be a drive command output from a control IC (not shown) to start locking.

Here, referring to FIG. 10, when the hook 19 of the lock arm 17 is completely engaged with the projection 22, the locking lever 41 is pivoted in the downward direction R2 to a lowermost position. Accordingly, the lock bar 37 moves to a maximum lock position (operational end position) at which the normal contact portion 52 faces the contact surface 48A of the position restriction portion 46. In this state, the normal contact portion 52 restricts pivoting of the locking lever 41 in the upward direction R1 and the locking device 23 shifts to a lock state.

As shown in FIG. 11, in an incomplete hooking state in which the hook 19 of the lock arm 17 is displaced upward, the lock arm 17 is separated upward by a distance Ha from the normal position. The locking lever 41 is also moved upward by the distance Ha.

Under this situation, when the lock bar 37 is moved straight in the lock direction K2, the first step 50 and the second step 51 enter the gap above the position restriction portion 46. Then, a side wall 52a between the normal contact portion 52 and the second step 51 comes into contact with a side wall of the position restriction portion 46. This stops the movement of the lock bar 37. The motor 30 then continues to produce rotation but the lock bar 37 remains still. In this state, the urging member 40 (absorption unit) functions to move only the lock stopper 33 in the lock direction K2. Accordingly, excessive stress is not applied to the lock stopper 33 and the lock bar 37. In the incomplete hooking state shown in FIG. 11, the second step 51 faces the contact surface 48A of the position restriction portion 46. Thus, the lock bar 37 holds the locking lever 41 from above and keeps the hook 19 hooked to the projection 22, and pivoting of the lock arm 17 in the opening direction is restricted. In this manner, even in the incomplete hooking state of FIG. 11, the locking device 23 is shifted to the lock state.

Further, as shown in FIG. 12, when the hook 19 of the lock arm 17 is greatly displaced from the projection 22, the lock arm 17 is separated upward by a distance Hb, which is greater than the distance Ha, from the normal position. The locking lever 41 is also moved upward by the distance Hb.

Under this situation, when the lock bar 37 is moved straight in the lock direction K2, only the first step 50 enters the gap above the position restriction portion 46. Then, a side wall 51a between the first step 50 and the second step 51 comes into contact with the side wall of the position restriction portion 46. This stops the movement of the lock bar 37. The motor 30 then continues to produce rotation but the lock bar 37 remains still. In this state, the urging member 40 (absorption unit) functions to move only the lock stopper 33 in the lock direction K2. Accordingly, excessive force is not applied to the lock stopper 33 and the lock bar 37. In the incomplete hooking state shown in FIG. 12, the first step 50 faces the contact surface 48A of the position restriction portion 46. Thus, the lock bar 37 holds the locking lever 41 from above and keeps the hook 19 hooked to the projection 22, and pivoting of the lock arm 17 in the opening direction is restricted. In this manner, even in the incomplete hooking state of FIG. 12, the locking device 23 is shifted to the lock state.

When the incomplete hooking state of the lock arm 17 is resolved, the lock arm 17 is pivoted in the downward direction R2 by the urging force of the urging member 45. As a result, the lock bar 37 is moved straight in the lock direction K2 by the urging force of the urging member 40 without being interfered by the locking lever 41. Thus, the normal contact portion 52 faces the contact surface 48A of the position restriction portion 46. In this manner, when the incomplete hooking state is resolved, the locking device 23 is automatically shifted to a normal and stable lock state.

When the locking device 23 is in a lock state and an unlock trigger is received at the motor 30, the motor 30 produces, for example, reverse rotation and starts an unlock operation. In this state, the lock stopper 33 and lock bar 37 move integrally and straight in the unlock direction S2. When the lock bar 37 reaches an unlock position, the locking device 23 returns to an unlock state. In the same manner as a lock trigger, an unlock trigger may be current (voltage) directly supplied from a door lock motor (not shown). Alternatively, the unlock trigger may be a drive command output from a control IC (not shown) to start unlocking.

As described above, in the present example, the contact surface 48B of the lock bar 37 that contacts the contact surface 48A of the locking lever 41 (position restriction portion 46) includes the stepped portion 49, i.e., has a stepped shape. Thus, when the lock arm 17 is incompletely hooked to the projection 22, the lock bar 37 (first step 50 or second step 51) restricts movement of the locking lever 41 and restricts pivoting of the lock arm 17. Thus, the locking device 23 may be shifted to a lock state not only when the lock arm 17 is in a complete hooking state but also when the lock arm 17 is in an incomplete hooking state.

The power plug locking device 23 of the present embodiment has the advantages described below.

(1) The contact surface 48B of the lock bar 37 has a stepped shape. Thus, even when the lock arm 17 is in an incomplete hooking state, the lock bar 37 may be moved to a position at which it restricts pivoting of the locking lever 41. In this manner, the locking device 23 is shifted to a lock state that restricts pivoting of the lock arm 17.

(2) The stepped portion 49, which includes the steps 50 and 51, obtain the stepped shape of the contact surface 48B. The step 50 or step 51 restricts pivoting of the locking lever 41 and restricts pivoting of the lock arm 17 even when the lock arm 17 is displaced upward from the projection 22 to different heights. This allows the locking device 23 to shift to a lock state in correspondence with different incomplete hooking states.

(3) The lock bar 37 is coupled to the lock stopper 33 and moved integrally with the lock stopper 33. The urging member 40 is arranged between the lock bar 37 and the lock stopper 33. When the lock arm 17 is in an incomplete hooking state and the lock bar 37 is moved in the lock direction K2, the urging member 40 absorbs the stress applied to the lock bar 37 in the unlock direction S2 and permits movement of only the lock stopper 33. This prevents excessive force from being applied to the lock bar 37 and the lock stopper 33. Further, even when the lock arm 17 is in an incomplete hooking state, the motor 30 and the lock stopper 33 operate in the same manner as when in a complete hooking state. Thus, there is no need for the surrounding components to perform special movements in an incomplete hooking state.

(4) The locking device 23 is electrically driven by the motor 30 and thus can be automatically switched between a lock state and an unlock state. Thus, a user does not have to manually switch to a lock state or an unlock state. This improves convenience.

It should be apparent to those skilled in the art that the present invention may be embodied in many other specific forms without departing from the spirit or scope of the invention. Particularly, it should be understood that the present invention may be embodied in the following forms.

The current may be detected to control the power supplied to the motor 30. In such a current detection control, the locking device 23 measures the current flowing to the motor 30, estimates the motor rotation speed from the measured current, and accumulates the moved distance of the lock bar 37 based on the motor rotation speed. When the current continuously exceeds a threshold, as long as the moved distance of the lock bar 37 has reached a minimum required distance, it is determined that a stopping current has been generated at a normal position and the supply of current to the motor 30 is stopped. In contrast, when the current continuously exceeds the threshold but the moved distance of the lock bar 37 has not reached the minimum required distance, it is determined that a stopping current has been generated at an abnormal position. In this case, after current is supplied for a specified period, the supply of current to the motor 30 is stopped. The current detection eliminates the need for sensors or the like and allows for reduction in the size of the locking device 23.

The motor 30 may be actuated for a fixed period.

The conditions for starting the charging of the battery 5 can be changed. For example, charging may be started when the plug connection detector 15 detects that the power plug 9 has been fitted to the inlet 14 and that ID verification of an electronic key has been satisfied.

A switch for stopping the charging of the battery 5 may be arranged in the vehicle.

The structure of the locking device 23 is not limited to the foregoing description and may be varied. For example, the lock bar 37 may be located directly above the lock arm 17 in a lock state.

The lock bar 37 is not limited to a type that moves straight. For example, the lock bar 37 may be of a rotation type rotated about an axis.

The locking device 23 may be manually locked and unlocked.

The locking device 23 may be manually locked and automatically unlocked.

A spring or the like may be used so that when the lock stopper 33 is moved excessively and separated from the shaft, the spring re-couples the lock stopper 33 and the shaft 31.

The stepped portion 49 (stepped shape) does not have to be formed on the contact surface 48B of the lock bar 37 and may be formed, for example, on the contact surface 48A of the locking lever 41 (position restriction portion 46).

When the lock bar 37 directly restricts pivoting of the lock arm 17 in the opening direction, the stepped portion 49 may be formed on the lock bar 37 or the lock arm 17.

The formation of the stepped portion 49 (stepped shape) is not limited to one of the lock bar 37 and the locking lever 41 and may be formed on both of the lock bar 37 and the locking lever 41.

The lock stopper 33 and the lock bar 37 may be formed by a single component.

The operation arm is not limited to a pivot type lock arm 17 and may have any shape or structure as long as it can be hooked to and removed from the projection 22 of the inlet 14.

A seal may be arranged at the opening 44 to ensure the water resistance of the case 24.

The vehicle 1 is applied to a hybrid vehicle in the above embodiment but may also be applied to, for example, an electric vehicle driven by only a motor.

The locking device 23 is applied to the vehicle 1 but may also be applied to other devices and apparatuses.

The present examples and embodiments are to be considered as illustrative and not restrictive, and the invention is not to be limited to the details given herein, but may be modified within the scope and equivalence of the appended claims.

The invention claimed is:

1. A power plug locking device that prevents unauthorized removal of a power plug from an inlet, wherein the power plug includes an operation arm that is able to be hooked to the inlet, the power plug locking device comprising:
   a lock unit that restricts movement of the operation arm when the operation arm is hooked to the inlet, wherein the lock unit includes:
      a first member moved between a lock position and an unlock position; and
      a second member of which movement is restricted in accordance with the movement of the first member, wherein the second member restricts the movement of the operation arm in cooperation with the first member that is moved to the lock position, wherein:
      the first member includes a first contact surface;
      the second member includes a second contact surface that is able to contact the first contact surface of the first member that is moved to the lock position; and
      at least one of the first contact surface and the second contact surface is formed with a stepped shape.

2. The power plug locking device according to claim 1, wherein the stepped shape includes a plurality of steps formed at different heights.

3. The power plug locking device according to claim 1, wherein:
   the stepped shape includes a first step and a second step formed at different heights on the first contact surface of the first member;
   the first contact surface includes a reference surface formed at a height that differs from the first and second steps; and
   the lock position includes three positions of:
      a position at which the first step faces toward the second contact surface;
      a position at which the second step faces toward the second contact surface; and
      a position at which the reference surface faces toward the second contact surface.

4. The power plug locking device according to claim 1, wherein
   the lock unit includes a coupling movement member coupled to the first member and is movable as a seat for the first member,
   the power plug locking device further comprises an absorption unit including an urging member arranged between the coupling movement member and the first member to urge the first member to the lock position,
   when the operation arm is incompletely hooked to the inlet thereby obstructing movement of the first member in a lock direction with the second member, the absorption unit absorbs stress applied to the first member in an unlock direction and permits movement of the coupling movement member in the lock direction relative to the first member.

5. The power plug locking device according to claim 1, further comprising an electric driving device that moves the first member to the lock position or the unlock position.

* * * * *